US010762497B2

(12) United States Patent
Powell et al.

(10) Patent No.: US 10,762,497 B2
(45) Date of Patent: Sep. 1, 2020

(54) SYSTEMS AND METHODS FOR SETTLING CHARGEBACK TRANSACTIONS

(71) Applicant: MASTERCARD INTERNATIONAL INCORPORATED, Purchase, NY (US)

(72) Inventors: Michael Scott Powell, Eureka, MO (US); Jeanne Bernadette Moore, St. Louis, MO (US); Ricky Eugene Barton, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 68 days.

(21) Appl. No.: 16/005,423

(22) Filed: Jun. 11, 2018

(65) Prior Publication Data

US 2018/0293575 A1 Oct. 11, 2018

Related U.S. Application Data

(63) Continuation of application No. 13/796,743, filed on Mar. 12, 2013, now Pat. No. 9,996,834.
(Continued)

(51) Int. Cl.
*G06Q 20/00* (2012.01)
*G06Q 20/38* (2012.01)
(Continued)

(52) U.S. Cl.
CPC ......... *G06Q 20/381* (2013.01); *G06Q 20/407* (2013.01); *G06Q 10/0635* (2013.01); *G06Q 30/06* (2013.01); *G06Q 40/04* (2013.01)

(58) Field of Classification Search
USPC ..................................... 705/35, 37
See application file for complete search history.

(56) References Cited

U.S. PATENT DOCUMENTS 7,464,057 B2    12/2008  Cole et al.
7,580,886 B1 *   8/2009  Schulz ................ G06Q 20/023
                                                          705/35
(Continued)

OTHER PUBLICATIONS

Card acceptance and chargeback management guidelines for VISA merchants—Visa Jan. 2008 (Year: 2008).*
(Continued)

*Primary Examiner* — William R Rankins
(74) *Attorney, Agent, or Firm* — Armstrong Teasdale LLP

(57) ABSTRACT

A chargeback settlement processing (CSP) computer system for determining a gain or loss in a chargeback transaction is provided, that includes a memory device and a processor in communication with the memory device. The processor is programmed to transmit to a payment card network for settlement at least one chargeback transaction file corresponding to at least one received chargeback transaction, associated with an original transaction settled using a first currency exchange rate. The at least one chargeback transaction file includes a unique file identifier. A reconciliation message received from the payment card network includes at least one settlement amount, determined at a second currency exchange rate, for the at least one chargeback transaction and the unique file identifier. The at least one chargeback transaction file is matched to the at least one settlement amount, using the unique file identifier, to determine whether a net gain or a net loss occurred.

21 Claims, 12 Drawing Sheets

Related U.S. Application Data

(60) Provisional application No. 61/667,003, filed on Jul. 2, 2012.

(51) Int. Cl.
*G06Q 20/40* (2012.01)
*G06Q 10/06* (2012.01)
*G06Q 40/04* (2012.01)
*G06Q 30/06* (2012.01)

(56) References Cited

U.S. PATENT DOCUMENTS

| | | | |
|---|---|---|---|
| 7,660,768 B2 | 2/2010 | Beck et al. | |
| 7,925,586 B2 | 4/2011 | Cole et al. | |
| 8,156,040 B2 * | 4/2012 | Gavin | G06Q 20/10 |
| | | | 705/35 |
| 8,311,944 B2 * | 11/2012 | Knowles | G06Q 20/105 |
| | | | 705/39 |
| 8,346,638 B2 | 1/2013 | Phillips et al. | |
| 9,747,599 B2 * | 8/2017 | Raymond | G06Q 40/00 |
| 2004/0148255 A1 * | 7/2004 | Beck | G06Q 40/12 |
| | | | 705/39 |
| 2005/0177464 A1 * | 8/2005 | Komem | G06Q 20/10 |
| | | | 705/26.1 |
| 2007/0038523 A1 * | 2/2007 | Komem | G06Q 20/381 |
| | | | 705/26.1 |
| 2010/0145744 A1 | 6/2010 | Beck et al. | |
| 2012/0005054 A1 | 1/2012 | Agarwal et al. | |
| 2012/0330718 A1 * | 12/2012 | Jain | G06O 30/06 |
| | | | 705/7.31 |
| 2014/0006264 A1 * | 1/2014 | Powell | G06Q 20/407 |
| | | | 705/39 |

OTHER PUBLICATIONS

Your guide to fees and interest schedules—Scotia Bank Jan. 2014. (Year: 2014).*
Card acceptance and chargeback management guidelines for VISA merchants—Visa Jan. 2000.
Your guide to fees and interest schedules—Scotia Bank Jan. 2014.

* cited by examiner

SYSTEMS AND METHODS FOR SETTLING CHARGEBACK TRANSACTIONS

CROSS-REFERENCE TO RELATED APPLICATIONS

This application is a continuation application of U.S. patent application Ser. No. 13/796,743, filed Mar. 12, 2013, entitled "SYSTEMS AND METHODS FOR SETTLING CHARGEBACK TRANSACTIONS", which claims the benefit of U.S. Provisional Application No. 61/667,003, filed Jul. 2, 2012, the disclosure of each of which is hereby incorporated by reference in its entirety.

BACKGROUND OF THE INVENTION

This invention relates generally to payment card networks and, more particularly, to systems and methods for settling payment card chargeback transactions involving varying currency exchange rates.

When a cardholder uses a transaction payment card to purchase goods or services from a merchant, an acquiring bank reimburses the merchant for the transaction. The acquiring bank then settles those funds with an issuer of the card (issuer) or a third party processor authorized to act on behalf of the issuer by presenting the transaction into a transaction payment card network. In a process known as clearing, transaction data is moved from the acquiring bank to the payment card network and from the payment card network to the issuer. After clearing, settlement occurs, which is a process used to exchange funds between the acquiring bank and the issuer (or third party processor) for the net value of a batch of all the monetary transactions cleared for that processing day. When the acquiring bank and the issuer are located in different countries or use different currencies, the currency where the merchant is located is used, and during settlement, the exchange rate on that particular day is used for the currency conversion.

On occasion, the cardholder may be unsatisfied with the goods or services provided by the merchant, so the cardholder may return the goods or request a chargeback from the cardholder's issuer. Generally, the issuer immediately issues a credit to the cardholder's account for the amount of the transaction. The issuer then sends a chargeback request to an issuer processor, which request is collected with other requests and submitted in a batch to a payment card network. After the batch of chargeback requests and associated transactions are processed by acquiring banks, a reconciliation file is transmitted back to the issuer processor, and then on to the issuer.

However, in such cases, the reconciliation file contains only a total net amount that potentially covers a plurality of chargeback transactions, without identifying individual transactions. The chargeback transactions may have involved the use of currency exchange rates. In such cases, the exchange rates that were applied would have been the rates in effect on the date that each individual chargeback request was submitted. As such, some of the chargeback transactions may result in a gain to the issuer while others may result in a loss. However, because known reconciliation files only provide a net settlement amount, an issuer cannot determine, with respect to individual chargeback transactions, whether a gain or a loss was realized upon receipt of settlement funds from the payment card network. In addition, to address such gains or losses requires manual intervention (per transaction) to reconcile an 'out of balance' condition and then the creation of a separate adjustment transaction for the difference.

Accordingly, it is desirable to provide a method and system for providing data representing chargeback transactions to a payment card network for settlement such that when the reconciliation message is received, the issuer processor can associate a settlement amount received from the payment card network with each chargeback transaction received from an issuer, and thus calculate a net gain or loss for each chargeback transaction.

BRIEF DESCRIPTION OF THE INVENTION

In one embodiment, a computer system for settling chargeback transactions is provided. The computer system includes a memory device for storing data; and a processor in communication with the memory device. The processor is programmed to transmit to a payment card network for settlement at least one chargeback transaction file corresponding to at least one received chargeback transaction, wherein the at least one chargeback transaction file includes a unique file identifier, the at least one chargeback transaction associated with an original transaction settled using a first currency exchange rate. The processor is further programmed to receive a reconciliation message from the payment card network that includes at least one settlement amount for the at least one chargeback transaction, wherein the at least one settlement amount is determined at a second currency exchange rate. The processor is further programmed to match the at least one chargeback transaction file to the at least one settlement amount based on the unique file identifier. The processor is further programmed to determine one of a net gain and a net loss for the at least one chargeback transaction resulting from a change between the first and second currency exchange rates.

In another embodiment, a computer-implemented method for determining a gain or loss in a chargeback transaction using a computing device coupled to a memory device is provided. The method includes transmitting to a payment card network for settlement at least one chargeback transaction file corresponding to at least one received chargeback transaction, wherein the at least one chargeback transaction file includes a unique file identifier, the at least one chargeback transaction associated with an original transaction settled using a first currency exchange rate. The method further includes receiving, at the computing device, a reconciliation message from the payment card network that includes at least one settlement amount for the at least one chargeback transaction, the at least one settlement amount determined at a second currency exchange rate. The method further includes matching the at least one chargeback transaction file to the at least one settlement amount based on the unique file identifier. The method further includes determining one of a net gain and a net loss for the at least one chargeback transaction resulting from a change between the first and second currency exchange rates.

In another embodiment, one or more computer-readable storage media having computer-executable instructions embodied thereon for determining a gain or loss in a chargeback transaction are provided. The computing device includes a memory device and a processor in communication with the memory device. When executed by the processor, the computer-executable instructions cause the processor to transmit to a payment card network for settlement at least one chargeback transaction file corresponding to at least one received chargeback transaction, wherein the at least one chargeback transaction file includes a unique file identifier, the at least one chargeback transaction associated with an original transaction settled using a first currency exchange rate. The computer-executable instructions further cause the processor to receive a reconciliation message from the payment card network that includes at least one settlement amount for the at least one chargeback transaction, the at least one settlement amount determined at a second currency exchange rate. The computer-executable instructions further cause the processor to match the at least one chargeback transaction file to the at least one settlement amount based on the unique file identifier. The computer-executable instructions further cause the processor to determine one of a net gain and a net loss for the at least one chargeback transaction resulting from a change between the first and second currency exchange rates.

DETAILED DESCRIPTION OF THE INVENTION

The embodiments described herein facilitate associating a net gain or loss of multiple chargeback transactions at an individual transaction level. More specifically, the embodiments described herein relate to a chargeback settlement processing (CSP) computer system that facilitates settling chargeback transactions involving currency conversion on behalf of an issuer and an acquiring bank at the transaction level.

Figure 1:
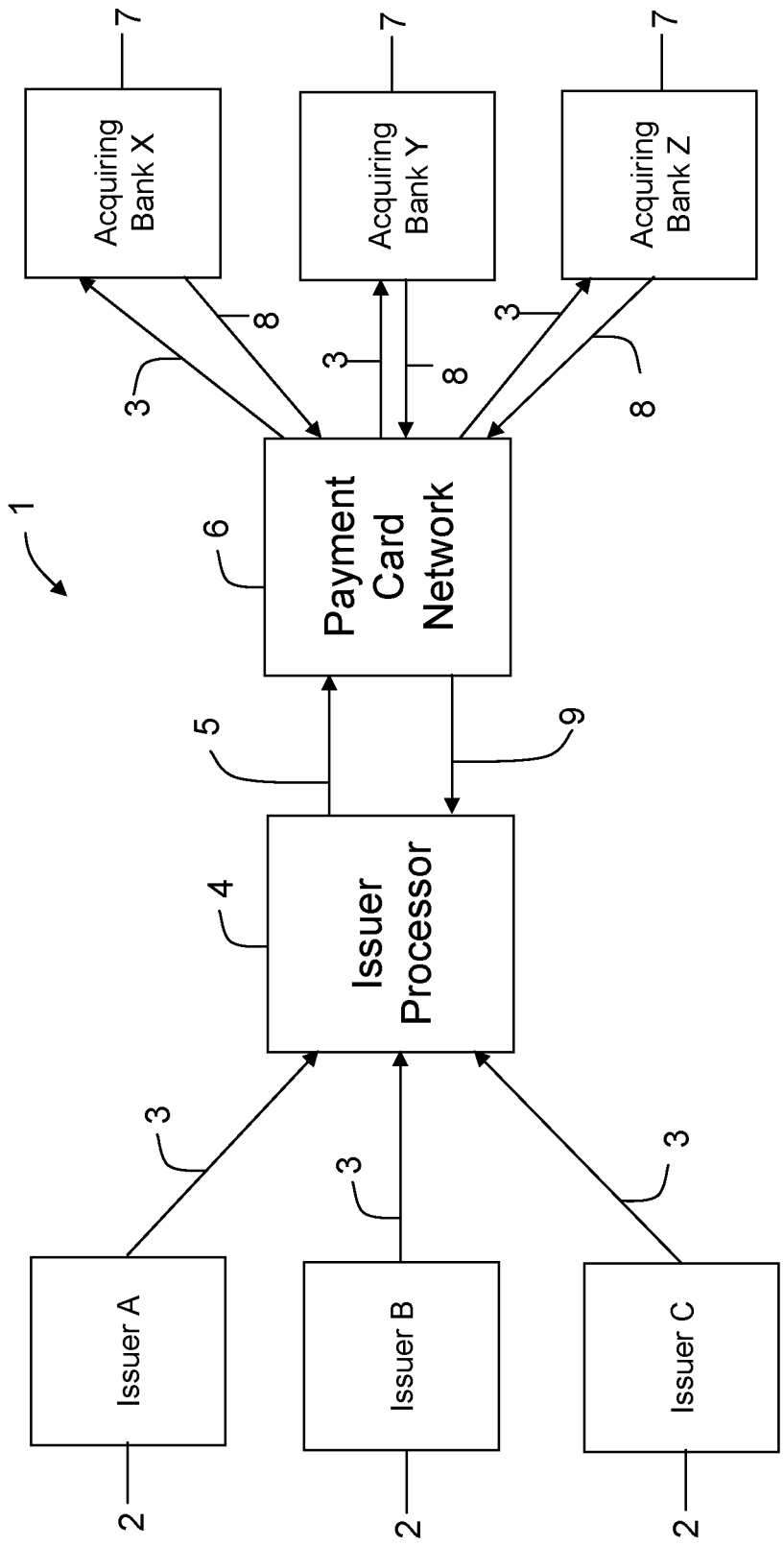
FIG. 1 is a simplified data flow block diagram of a known payment card system used to settle chargeback transactions.

FIG. 1 is a simplified data flow block diagram of a known payment card system 1 used to settle chargeback transactions. As part of the daily settlement process, at least one issuer 2 transmits a chargeback request received from a cardholder as a chargeback transaction 3 to an issuer processor 4 for chargeback settlement. The chargeback transaction 3 includes the transaction data relating to the original transaction. Issuer processor 4 generates a batch file 5 containing multiple chargeback transactions 3 from multiple issuers 2 to send to a payment card network 6 for chargeback settlement. As will be described below, batch file 5 contains multiple chargeback transactions 3, each being associated with a specific issuer 2. Payment card network processes batch file 5 and transmits chargeback transactions 3 to acquiring banks 7 determined from the transaction data in batch file 5 for settlement.

Acquiring banks 7 process chargeback transactions 3. In an example embodiment, acquiring banks 7 do not respond to a chargeback request. In alternative example embodiments, acquiring banks 7 may transmit a chargeback response message 8 representing acknowledgement from acquiring banks 7 to payment card network 6. Inasmuch as chargeback transactions are known as "force post" transactions, chargeback transactions are settled whether or not acquiring banks 7 agree with chargeback transactions 3. Payment card network 6 determines the exchange rate for the day and applies it to each chargeback transaction 3. Payment card network 6 transmits a reconciliation file 9 to issuer processor 4, which includes a net settlement amount for each issuer 2 and all corresponding chargeback transactions 3.

Figure 2:
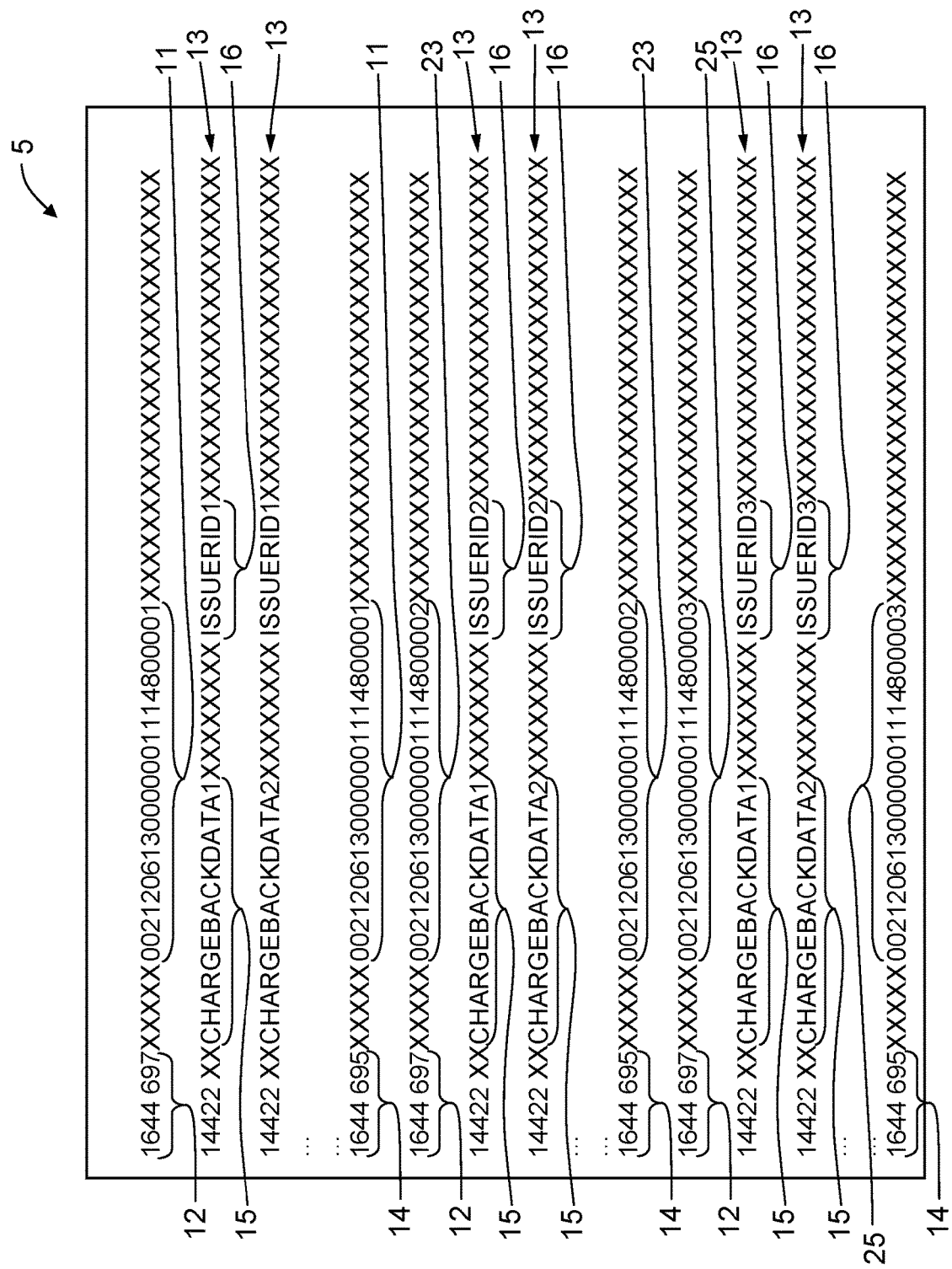
FIG. 2 is a screenshot of the known batch file shown in FIG. 1 in a form processed by a known payment card network.

FIG. 2 is a screenshot of the known batch file 5 shown in FIG. 1 in a form processed by a known payment card network. Batch file 5 includes a file header 12, a detailed record 13 associated with each chargeback transaction 3 (shown in FIG. 1), and a file trailer 14. File header 12 represents the beginning of a file for payment card network 6 to process. File trailer 14 identifies the end of chargeback transaction data for batch file 5. File header 12 and file trailer 14 each include a unique file identifier (ID) 11. Detailed record 13 is stored within the file and includes chargeback transaction data 15 (e.g., "CHARGEBACKXDATAX1") such as the payment card number used for the original transaction and an originating institution, or issuer 2, identification (ID) number 16 (e.g., "ISSUERID1") for each chargeback transaction 3. Issuer ID number 16 identifies which issuer 2 owns the cardholder relationship for a chargeback transaction.

Figure 3:
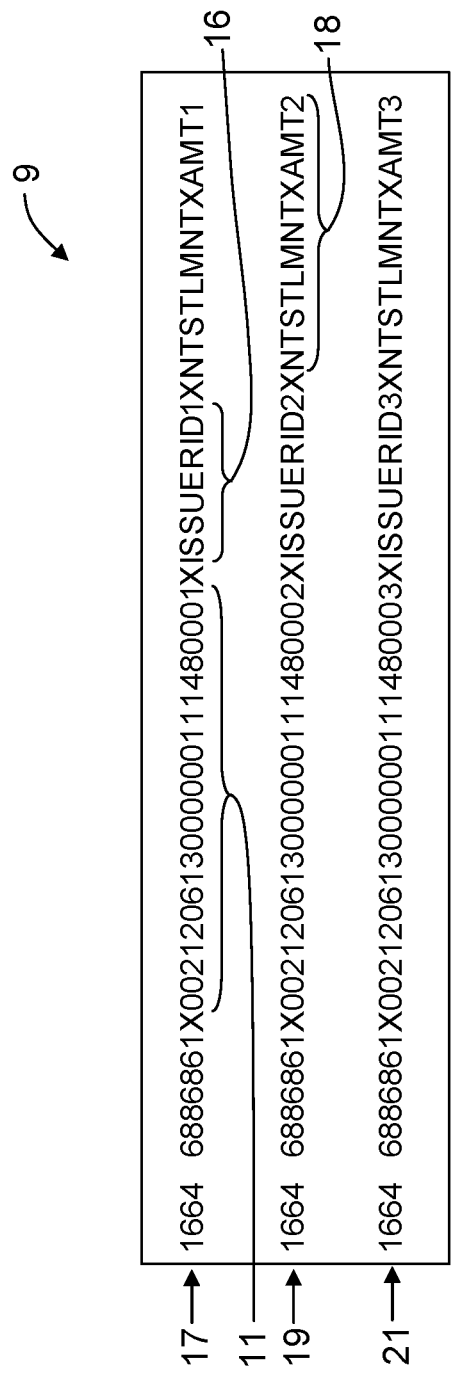
FIG. 3 is a screenshot of the known reconciliation message shown in FIG. 1 in a form transmitted by a known payment card network.

FIG. 3 is a screenshot of the known reconciliation file 9 shown in FIG. 1 in a form transmitted by a known payment card network. Reconciliation file 9 includes a single reconciliation message 17, 19, 21 for each issuer 2 (shown in FIG. 1). Each reconciliation message 17, 19, 21 includes unique file identifier 11 (e.g., "002120613000000111480001"), issuer ID number 16 (e.g., "ISSUERID1") and a net settlement amount 18 (e.g., "NTSTLMNTXAMT2") for issuer 2. Net settlement amount 18 represents all of chargeback transactions 3 settled that day for a particular issuer 2.

In operation, issuer 2 (i.e., issuer A shown in FIG. 1) transmits chargeback transaction 3, including transaction data relating to the original transaction for which chargeback is requested, to issuer processor 4 for chargeback settlement. Issuer processor 4 creates detailed record 13 (shown in FIG.

2) for chargeback transaction 3 and stores it in batch file 5. Detailed record 13 includes transaction data 15 and issuer ID number 16 assigned by issuer processor 4. Issuer processor 4 repeats this process for multiple chargeback transactions 3 received from multiple issuers 2 (i.e., issuers A, B, and C shown in FIG. 1).

At the end of each day, issuer processor 4 transmits batch file 5, which includes multiple detailed records 13, to payment card network 6 for chargeback settlement. Payment card network 6 processes batch file 5 and transmits each chargeback transaction 3 to an associated acquiring bank 7 (i.e., acquiring bank X, Y, or Z shown in FIG. 1) based on transaction data 15. Whether or not payment card network 6 receives chargeback response messages 8 from acquiring banks 7, payment card network 6 determines the applicable exchange rate for the day and calculates a chargeback settlement amount for each chargeback transaction 3. Payment card network 6 then extracts issuer ID number 16 from each detailed record 13 and aggregates all chargeback transactions 3 associated with each particular issuer ID number 16.

Payment card network 6 then transmits reconciliation file 9 to issuer processor 4, which includes one reconciliation message 17, 19, 21 (shown in FIG. 3) for each issuer 2. For issuer A, reconciliation message 17 includes only a net settlement amount for all chargeback transactions 3 submitted by issuer A, rather than the settlement amount for each chargeback transaction separately. The message is the same for issuers B and C, and any other issuer that submitted chargeback transactions.

Because chargeback transactions 3 involve currency conversion, payment card network 6 uses the exchange rate applicable on the day the chargeback request is submitted, so often times the exchange rate used for the chargeback settlement is different than the exchange rate used for the original transaction. Thus, issuer 2 may realize a gain or a loss when the settlement funds are returned from payment card network 6.

Because payment card network 6 provides only a single reconciliation message 17, 19, 21, with a net settlement amount for each issuer 2, there is no way of identifying which individual chargeback transactions 3 return a gain and which return a loss based on the different exchange rates. Accordingly, embodiments of the present invention described herein provide for the identification of individual chargeback transactions.

In the example embodiment, the CSP computer system is used for processing chargeback transactions. The CSP computer system is in communication with a payment card system. The payment card system is used for processing and storing transaction data of users. The CSP computer system is used for receiving chargeback messages for original transactions, transmitting chargeback transactions associated with the transactions to a payment card network, and associating the chargeback settlement funds received from the payment card network with the original transactions, wherein each chargeback transaction may involve varying currency exchange rates between the time of the original transaction and the time of the chargeback transaction.

The methods and systems described herein may be implemented using computer programming or engineering techniques including computer software, firmware, hardware, or any combination or subset thereof, wherein the technical effect may be achieved by performing at least one of the following steps: (a) transmitting to a payment card network for settlement at least one chargeback transaction file corresponding to at least one received chargeback transaction, wherein the at least one chargeback transaction file includes a unique file identifier, the at least one chargeback transaction associated with an original transaction settled using a first currency exchange rate; (b) receiving, at the computing device, a reconciliation message from the payment card network that includes at least one settlement amount for the at least one chargeback transaction, the at least one settlement amount determined at a second currency exchange rate; (c) matching the at least one chargeback transaction file to the at least one settlement amount based on the unique file identifier; (d) determining one of a net gain and a net loss for the at least one chargeback transaction resulting from a change between the first and second currency exchange rates; (e) generating, at the computing device, the at least one chargeback transaction file, wherein the at least one chargeback transaction file includes a file header including at least one of the unique file identifier, transaction data representing the original transaction associated with the at least one chargeback transaction, and a file trailer; (f) generating, at the computing device, a batch file including a plurality of chargeback transaction files associated with respective ones of a plurality of chargeback transactions from a plurality of issuers, the batch file including the at least one chargeback transaction file; (g) assigning, in each chargeback transaction file, a unique file identifier associated with a respective one of the plurality of chargeback transactions; (h) storing the batch file in the memory device; (i) transmitting, from the computing device, the batch file to the payment card network for settlement; (j) transmitting, from the computing device, a message to an issuer associated with the at least one chargeback transaction indicating the determined one of net gain and net loss associated with the at least one chargeback transaction.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of payment card can be used as a method of payment for performing a transaction. In addition, consumer card account behavior can include but is not limited to purchases, management activities (e.g. balance checking), bill payments, achievement of targets (meeting account balance goals, paying bills on time), and/or product registrations (e.g. mobile application downloads).

In one embodiment, a computer program is provided, and the program is embodied on a computer readable medium. The computer program is executed on a single computer system, without requiring a connection to a sever computer. In another embodiment, the program is being run in a Windows® environment (Windows is a registered trademark of Microsoft Corporation, Redmond, Wash.). In yet another embodiment, the program is run on a mainframe environment and a UNIX® server environment (UNIX is a registered trademark of X/Open Company Limited located in Reading, Berkshire, United Kingdom). The program is flexible and designed to run in various different environments without compromising any major functionality. In some embodiments, the program includes multiple components distributed among a plurality of computing devices. One or more components may be in the form of computer-executable instructions embodied in a computer-readable medium. The systems and methods are not limited to the specific embodiments described herein. In addition, components of each system and each method can be practiced independent and separate from other components and methods described herein. Each component can also be used in combination with other systems and methods.

The following detailed description illustrates embodiments of the invention by way of example and not by way of limitation. It is contemplated that the invention has general application to processing financial transaction data by a third party in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

Figure 4:
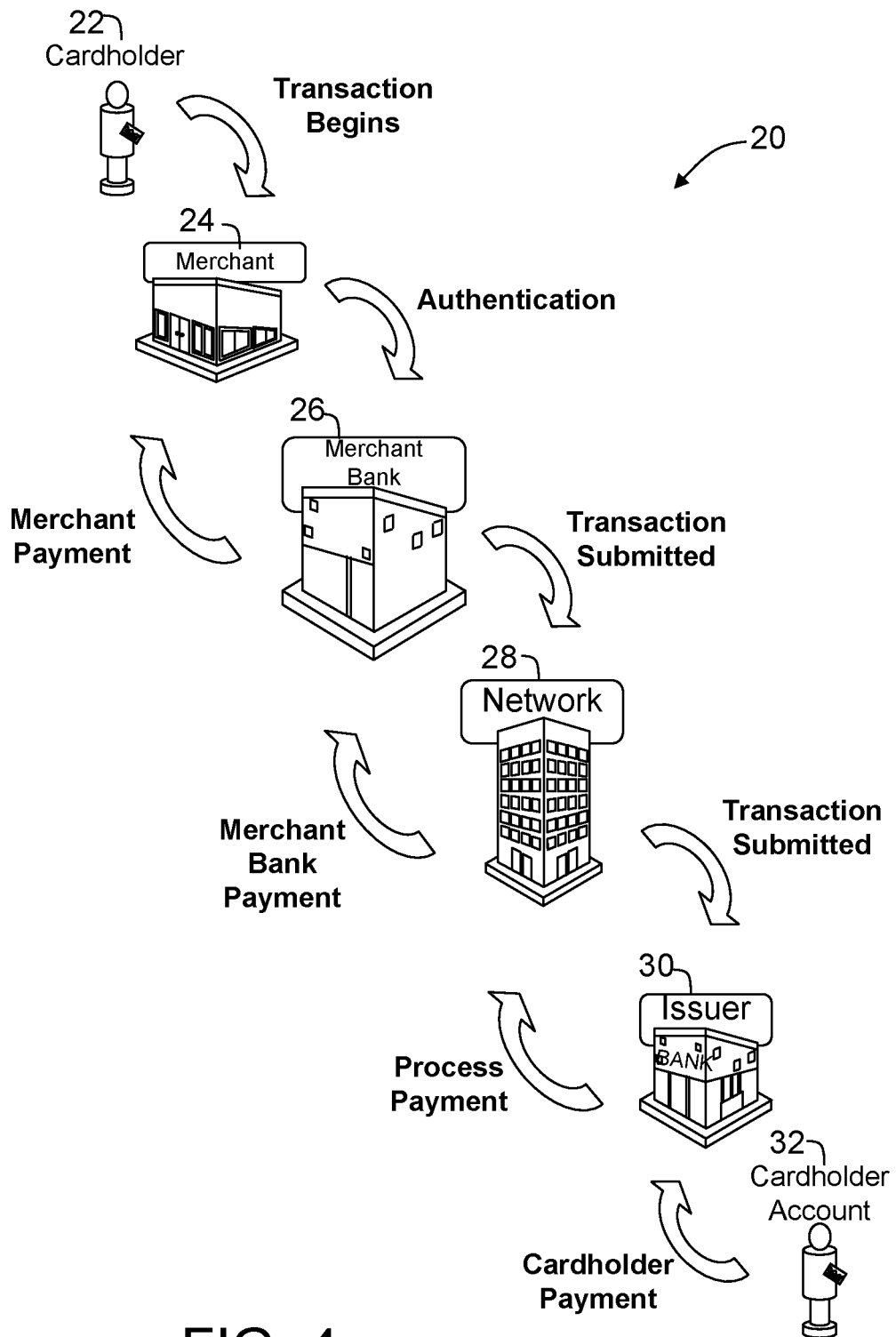
FIG. 4 is a schematic diagram illustrating an example multi-party payment card industry system for enabling ordinary payment-by-card transactions in which merchants and card issuers do not necessarily have a one-to-one relationship.

FIG. 4 is a schematic diagram illustrating an example multi-party payment card system 20 for enabling ordinary payment card transactions in which merchants and card issuers do not necessarily have a one-to-one relationship. The present invention relates to payment card system 20, such as a credit card payment system using the MasterCard® (MasterCard is a registered trademark of MasterCard International Incorporated located in Purchase, N.Y.) payment card system interchange network 28. MasterCard® payment card system interchange network 28 is a proprietary communications standard promulgated by MasterCard International Incorporated® for the exchange of financial transaction data between financial institutions that are members of MasterCard International Incorporated®.

In payment card system 20, a financial institution, such as an issuer 30, issues a payment account card, such as a credit card account or a debit card account, to a cardholder 22, who uses the payment account card to tender payment for a purchase from a merchant 24. To accept payment with the payment account card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment account card (also known as a financial transaction card), merchant 24 requests authorization from acquiring bank 26 for the amount of the purchase. The request may be performed over the telephone or the Internet, but is usually performed through the use of a point-of-sale terminal, which reads the cardholder's account information from the magnetic stripe on the payment account card and communicates electronically with the transaction processing computers of acquiring bank 26. Alternatively, acquiring bank 26 and/or issuer 30 may authorize a third party to perform transaction processing on its behalf. In the case of acquiring bank 26, the point-of-sale terminal will be configured to communicate with the third party. Such a third party is usually called a "merchant processor" or an "acquiring processor." In the case of issuer 30, the third party is authorized to communicate with payment card interchange network 28 to authorize, clear, and settle transactions on behalf of issuer 30. Such a third party is usually called an "issuer processor."

Using payment card system interchange network 28, the computers of acquiring bank 26 or the merchant processor will communicate with the computers of issuer 30 or the issuer processor to determine whether the cardholder's account is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated.

For debit card transactions, when a request for a PIN authorization is approved by the issuer, the cardholder's account 32 is decreased. Normally, a charge is posted immediately to cardholder's account 32. The bankcard association then transmits the approval to the acquiring processor for distribution of goods/services, or information or cash in the case of an ATM.

After a purchase has been made, a clearing process occurs to transfer additional transaction data related to the purchase among the parties to the transaction, such as acquiring bank 26, interchange network 28, and issuer 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, are associated with a transaction and transmitted between parties to the transaction as transaction data, and may be stored by any of the parties to the transaction. Alternatively, the clearing process may occur between an issuer processor on behalf of issuer 30, interchange network 28, and acquirer processor on behalf of acquiring bank 26.

After a transaction is captured, the transaction is settled between merchant 24, acquiring bank 26, and issuer 30. Settlement refers to the transfer of financial data or funds between the merchant's 24 account, acquiring bank 26, and issuer 30 related to the transaction. Usually, transactions are captured and accumulated into a "batch," which is settled as a group. More specifically, a transaction is typically settled between issuer 30 and interchange network 28, and then between interchange network 28 and acquiring bank 26, and then between acquiring bank 26 and merchant 24.

In some transactions, cardholder 22 requests a refund or initiates a chargeback of funds. A chargeback may occur for technical reasons such as insufficient funds, clerical reasons such as duplicate billing and/or incorrect amount billed, quality reasons such as when a consumer claims to have never received the goods as promised, and/or fraud reasons where a consumer did not authorize the purchase. To initiate a chargeback, cardholder 22 contacts issuer 30 and disputes a transaction. Issuer 30 submits the transaction to interchange network 28, which provides clearing and settlement services to its members. Interchange network 28 submits the chargeback to acquiring bank 26. Acquiring bank 26 either resolves the dispute or forwards it to merchant 24. Merchant 24 either accepts the chargeback or re-presents it back to acquiring bank 26. Acquiring bank 26 forwards the response from merchant 24 back to interchange network 28. Interchange network 28 then settles the chargeback with issuer 30. Based on the response, issuer 30 either reposts the charge to cardholder account 32 or resubmits the transaction to interchange network 28 for a financial liability decision. Issuer 30 also provides cardholder 22 a dispute resolution summary. In some embodiments, the third party issuer processor performs chargeback processing on behalf of issuer 30. In these embodiments, issuer 30 submits chargeback messages to the issuer processor, and the issuer processor communicates with interchange network 28 to settle the chargeback. Issuer 30 may choose to receive the settlement funds directly from interchange network 28 after settlement occurs, or alternatively, issuer 30 may authorize the issuer processor to settle with interchange network 28, and then issuer 30 settles with the issuer processor.

Figure 5:
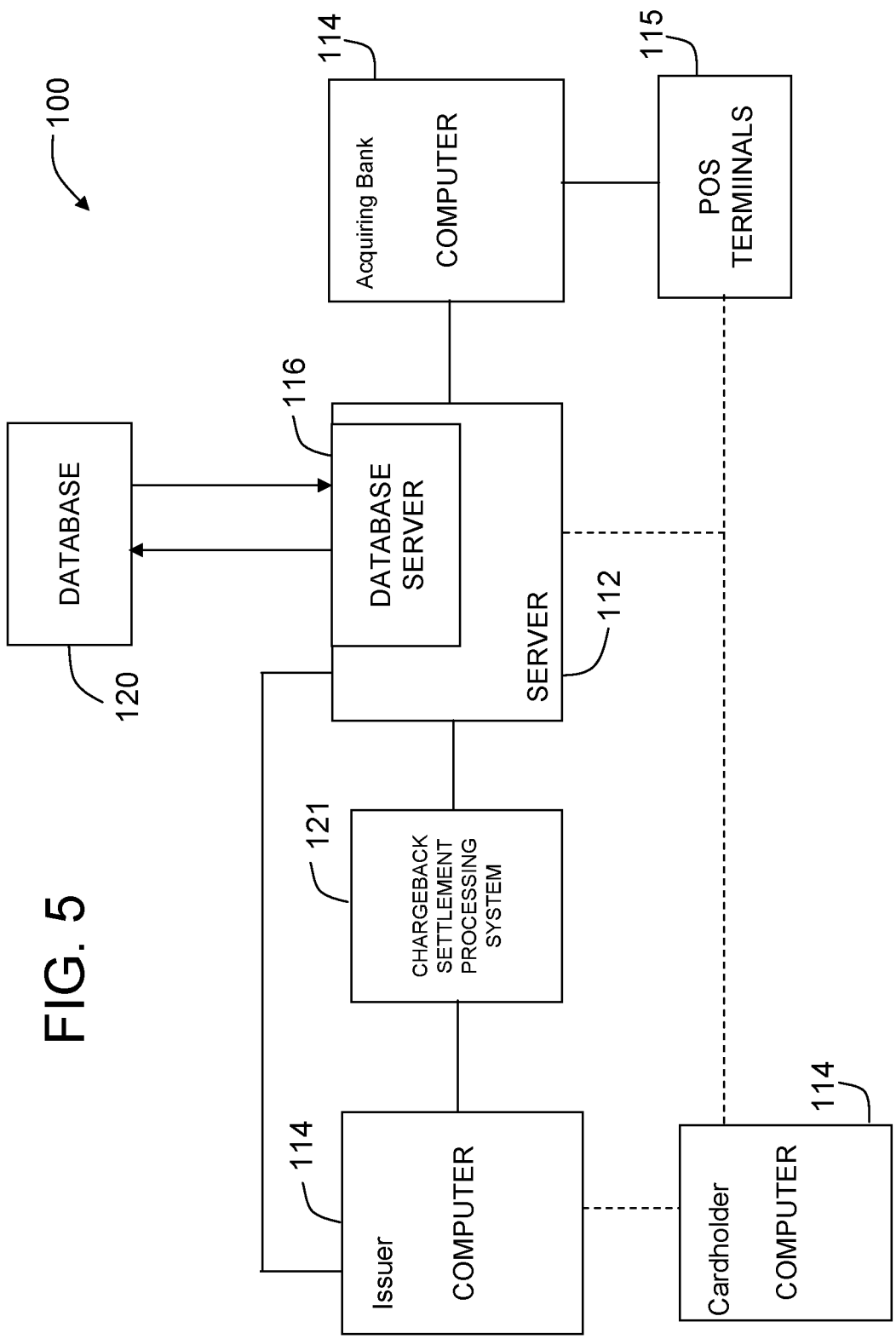
FIG. 5 is a simplified block diagram of an example payment card system including a chargeback settlement processing (CSP) computer system in accordance with one embodiment of the present invention.

FIG. 5 is a simplified block diagram of an example payment system 100 including a chargeback settlement processing (CSP) computer system 121 for settling chargeback transactions including an exchange rate between two or more currencies in accordance with one embodiment of the present invention. In the example embodiment, CSP computer system 121 settles chargeback transactions between acquiring banks and issuers where the chargeback transactions involve currency conversion.

In the example embodiment, CSP computer system 121 is in communication with a payment card system. The payment card system is used for processing and storing transaction data of users. CSP computer system 121 is used to settle chargeback transactions between an issuer and an acquiring bank, where the chargeback involves currency conversion. The chargeback relates to a dispute lodged by a user with respect to at least one transaction assigned to an account associated with a cardholder.

More specifically, system 100 includes CSP computer system 121 in communication with a payment card system, for example, payment card system 20 (shown in FIG. 4), wherein CSP computer system 121 is configured to process chargeback transactions associated with original transactions involving currency conversions charged at a first exchange rate initiated by cardholders using payment cards, receive the chargeback transactions from issuers of the payment cards, generate a chargeback transaction file that includes a unique file identifier for each chargeback transaction, batch all of the chargeback transaction files into a batch file to send to the payment card network, store the batch file in a memory device, transmit the batch file to the payment card network, receive a reconciliation message from the payment card network, wherein the reconciliation message includes a chargeback settlement amount and the unique file identifier for each chargeback transaction, match each chargeback transaction with its associated settlement amount using the unique file identifiers, determine a net gain or loss for each settled chargeback transaction due to the change in the exchange rate from the time of the original transaction to the time of the chargeback transaction.

In the example embodiment, system 100 includes a server system 112, which is a type of computer system, and a plurality of client sub-systems (also referred to as client systems 114) connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, Integrated Services Digital Network (ISDN) lines, and/or fiber optic network lines. Client systems 114 could be any device capable of interconnecting to the Internet including a web-based phone, PDA, or other web-based connectable equipment.

System 100 also includes point-of-sale (POS) terminals 115, which are connected to client systems 114 and may be connected to server system 112. POS terminals 115 are interconnected to the Internet through many interfaces including a network, such as a LAN or a WAN, dial-in-connections, cable modems, wireless modems, ISDN lines, and/or fiber optic network lines. POS terminals 115 could be any device capable of interconnecting to the Internet and including an input device capable of reading information from a cardholder's financial transaction card.

A database server 116 is connected to database 120, which contains information on a variety of matters, as described below in greater detail. In one embodiment, centralized database 120 is stored on server system 112 and can be accessed by cardholders at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and/or purchases made. Database 120 may also store account data including at least one of a cardholder name, a cardholder address, an account number, and other account identifiers. Database 120 may also store merchant data including a merchant identifier that identifies each merchant registered to use the payment account card network, and instructions for settling transactions including acquiring bank account information. Database 120 may also store purchase data associated with items being purchased by a cardholder from a merchant, and authorization request data.

In the example embodiment, one of client systems 114 may be associated with acquiring bank 26 (shown in FIG. 4) while another one of client systems 114 may be associated with issuer 30 (shown in FIG. 4). POS terminal 115 may be associated with merchant 24 (shown in FIG. 4) and server system 112 may be associated with payment card system interchange network 28.

System 100 also includes CSP computer system 121 coupled to at least one of client systems 114 and/or server system 112. In the example embodiment, CSP computer system 121 is associated with or controlled by a third-party issuer processor authorized to process chargeback transactions on behalf of an issuer. In an alternative embodiment, CSP computer system 121 may be associated with or controlled by a payment card network. CSP computer system 121 is interconnected to the Internet through many interfaces including a network, such as a LAN or a WAN, dial-in-connections, cable modems, wireless modems, ISDN lines, and/or fiber optic network lines.

Figure 6:
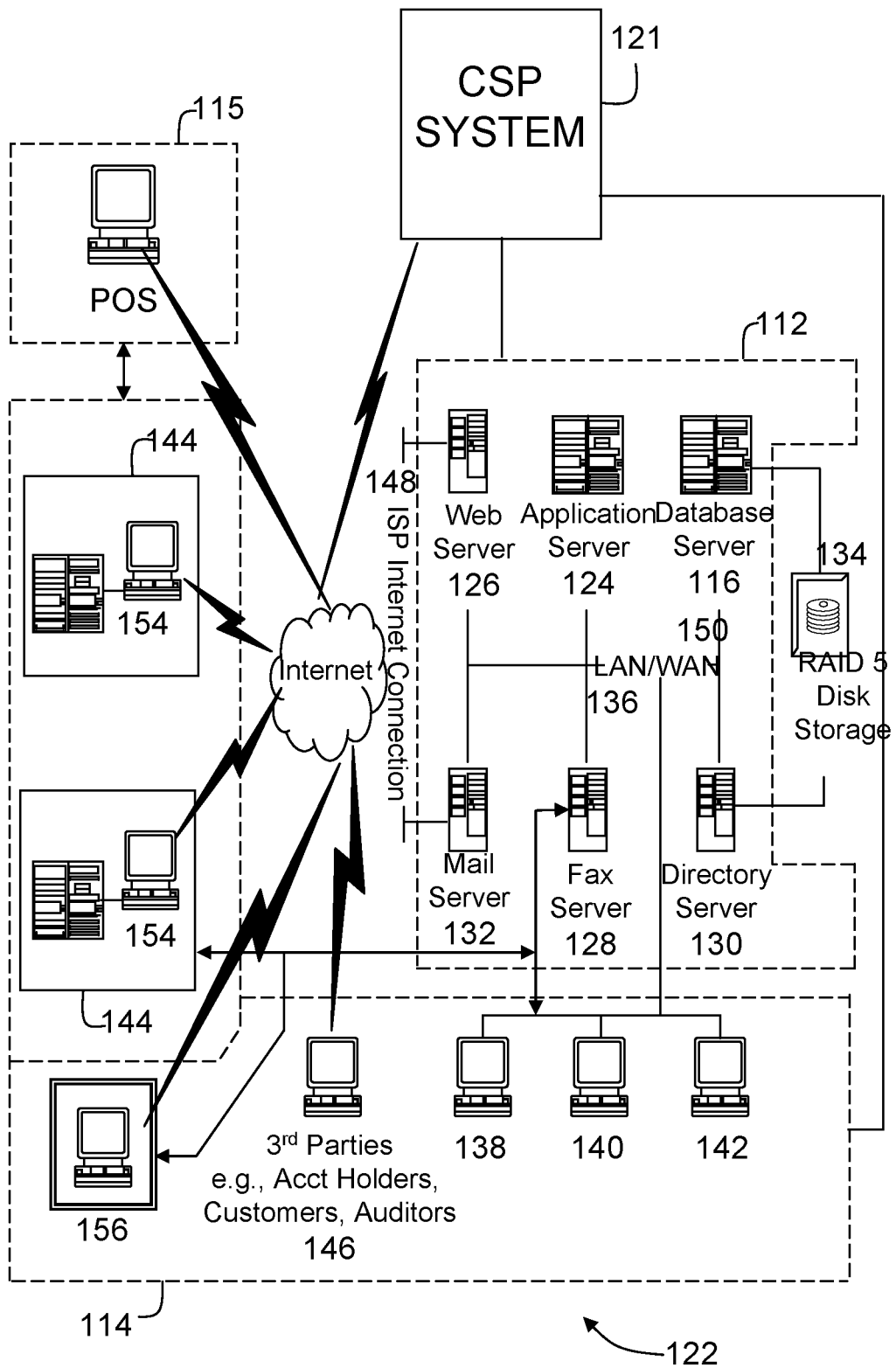
FIG. 6 is an expanded block diagram of an example embodiment of a server architecture of the payment card system shown in FIG. 5 including the CSP computer system in accordance with one embodiment of the present invention.

FIG. 6 is an expanded block diagram of an example embodiment of a server architecture of a payment card system 122, including CSP computer system 121 (shown in FIG. 5) in accordance with one embodiment of the present invention. Components in system 122, identical to components of system 100 (shown in FIG. 5), are identified in FIG. 4 using the same reference numerals as used in FIG. 5. System 122 includes server system 112, client systems 114, POS terminals 115, and CSP computer system 121. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a LAN 136. In addition, a system administrator workstation 138, a user workstation 140, and a supervisor workstation 142 are coupled to server system 112 by LAN 136. Alternatively, workstations 138, 140, and 142 are coupled to server system 112 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. Communication in the example embodiment is illustrated as being performed using the Internet, however, any other WAN type communication can be utilized in other embodiments, i.e., the systems and methods are not limited to being practiced using the Internet. In addition, and rather than WAN 150, LAN 136 could be used.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

CSP computer system 121 is in communication with server system 112 and in communication with at least one of client systems 114 and other workstations through a network connection.

Figure 7:
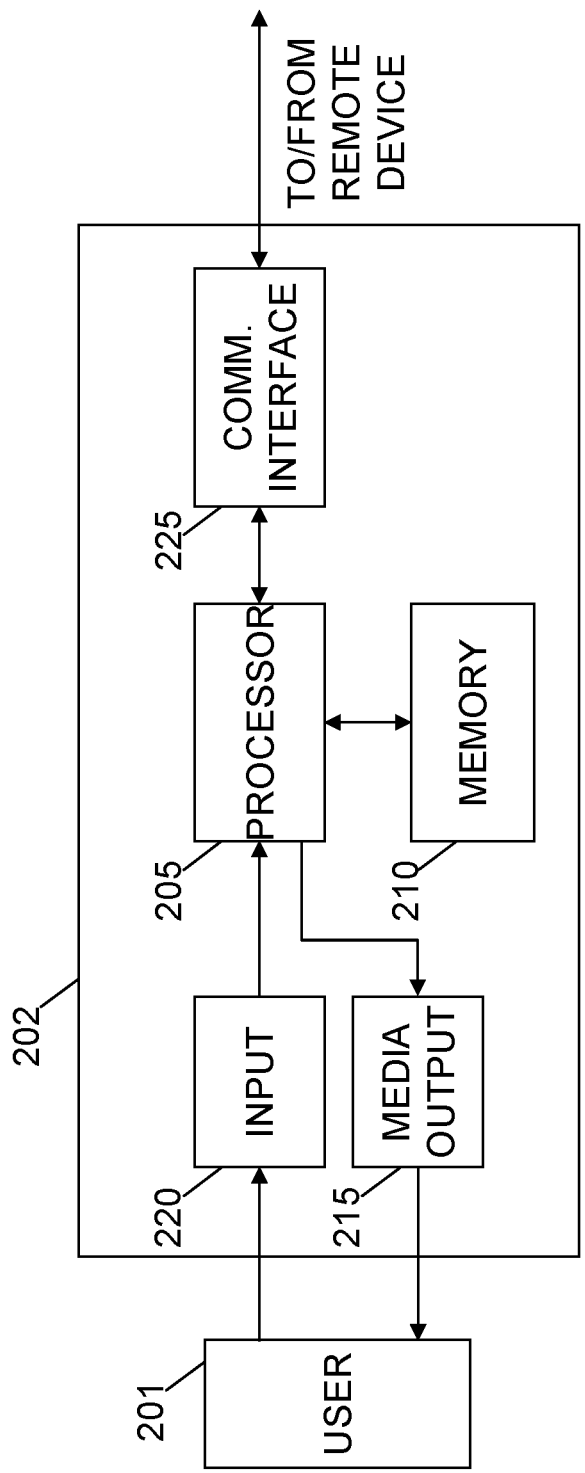
FIG. 7 illustrates an example configuration of a client computer device operated by a user.

FIG. 7 illustrates an example configuration of a user system 202 operated by a user 201, such as cardholder 22 (shown in FIG. 4). User system 202 may include, but is not limited to, client systems 114, 138, 140, and 142, POS terminal 115, workstation 154, and manager workstation 156 (shown in FIG. 4).

User system 202 includes a processor 205 for executing instructions. In some embodiments, executable instructions are stored in a memory area 210. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter (not shown) such as a video adapter and/or an audio adapter. The output adapter may be operatively coupled to processor 205 and operatively coupleable to an output device such as a display device (e.g., a liquid crystal display (LCD), an organic light emitting diode (OLED) display, a cathode ray tube (CRT), an "electronic ink" display, or an audio output device (e.g., a speaker or headphones).

In some embodiments, user system 202 includes an input device 220 for receiving input from user 201. Input device 220 may include, for example, a keyboard, a keypad, a pointing device, a mouse, a stylus, a touch sensitive panel (e.g., a touch pad or a touch screen), a gyroscope, an accelerometer, a position detector, or an audio input device. A single component, such as a touch screen, may function as both an output device of media output component 215 and input device 220.

User system 202 may also include a communication interface 225, which is communicatively coupleable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable cardholders, such as user 201, to display and interact with media and other information typically embedded on a web page or a website from server system 112. A client application allows user 201 to interact with a server application from server system 112.

Figure 8:
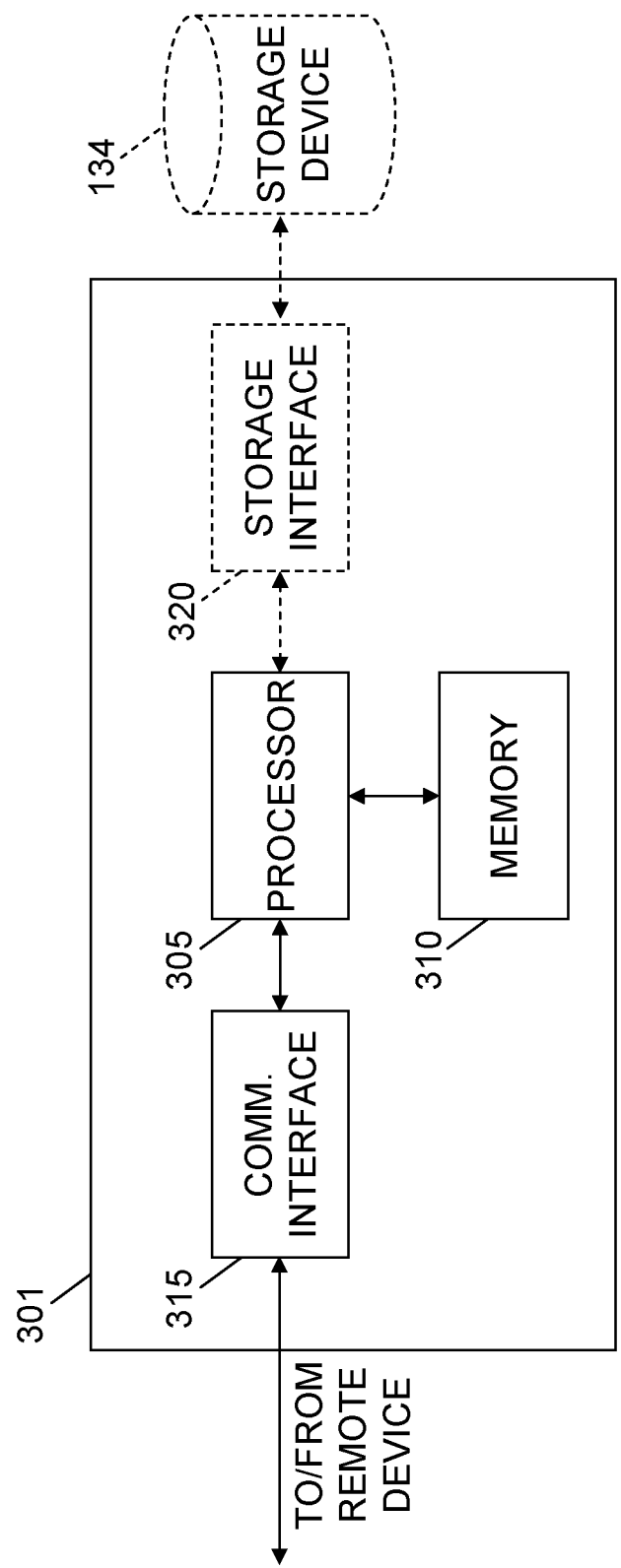
FIG. 8 illustrates an example configuration of a server computer device such as the server system shown in FIGS. 5 and 6.

FIG. 8 illustrates an example configuration of a server system 301 such as server system 112 (shown in FIGS. 5 and 6). Server system 301 may include, but is not limited to, database server 116, application server 124, web server 126, fax server 128, directory server 130, and mail server 132 (all shown in FIG. 6).

Server system 301 includes a processor 305 for executing instructions. Instructions may be stored in a memory area 310, for example. Processor 305 may include one or more processing units (e.g., in a multi-core configuration) for executing instructions. The instructions may be executed within various different operating systems on the server system 301, such as UNIX®, LINUX® (LINUX is a registered trademark of Linus Torvalds), Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from client system 114 via the Internet, as illustrated in FIGS. 5 and 6.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

Figure 9:
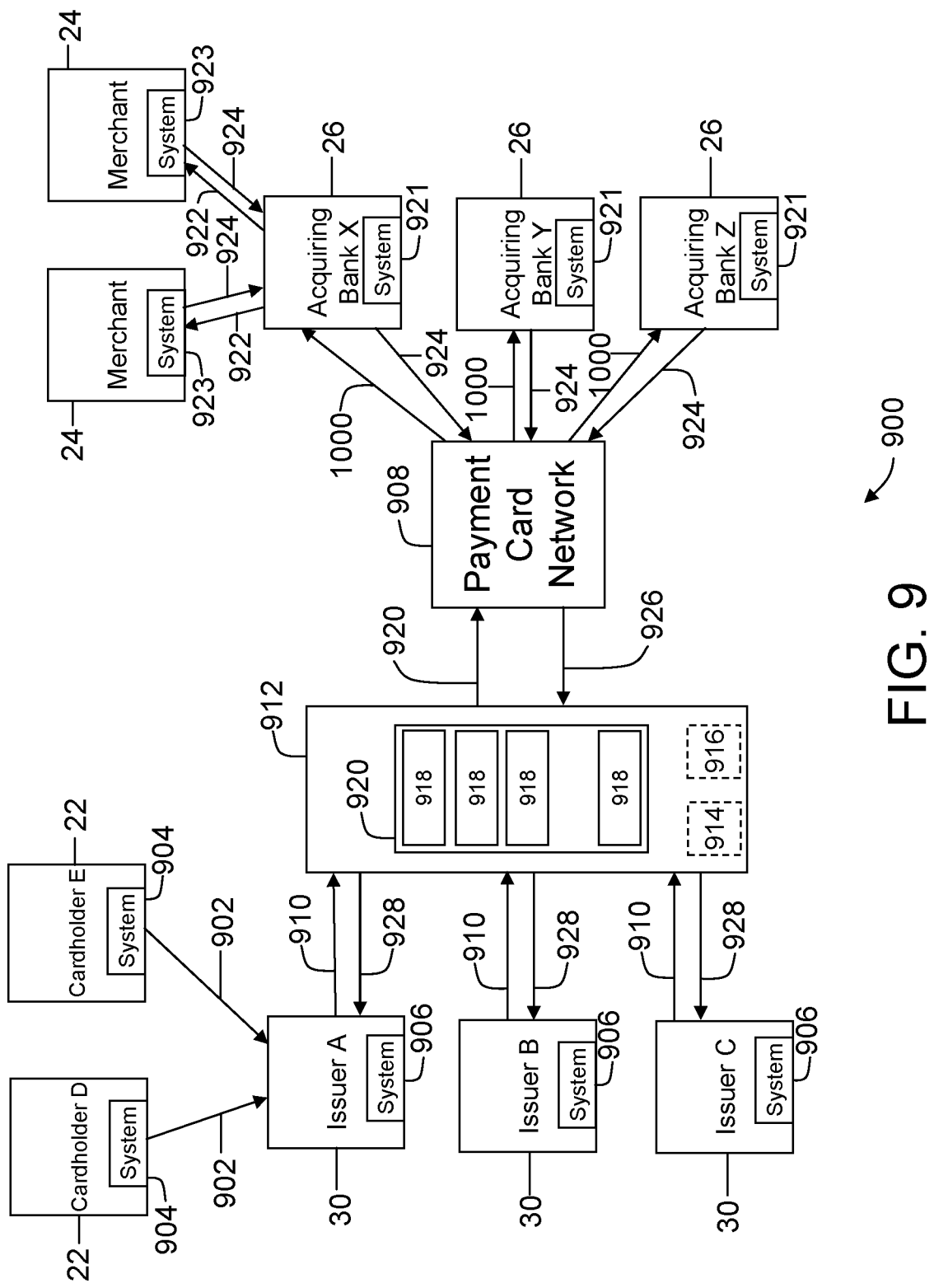
FIG. 9 is a simplified data flow block diagram of a payment card system that includes a CSP computer system as shown in FIGS. 5 and 6 in accordance with one embodiment of the present invention.

FIG. 9 is a schematic data flow diagram of an example payment card system 900 that includes a CSP computer system as shown in FIGS. 5 and 6 for settling chargeback transactions that involve currency conversion between at least one issuer and at least one acquiring bank. Payment card system 900 is similar to system 100 shown in FIG. 5.

In the example embodiment, the data flow within system 900 includes transmitting a chargeback request 902 by a cardholder, for example, cardholder 22 (shown in FIG. 4). More specifically, cardholder 22 transmits chargeback request 902 to an issuing bank, for example, issuer 30 (shown in FIG. 4). Chargeback request 902 is transmitted by cardholder 22 using a cardholder computer system 904, which is similar to client system 114 (shown in FIG. 5), to an issuer computer system 906, which is similar to client system 114.

In the example embodiment, chargeback request 902 relates to a request for a chargeback of at least a portion of an original transaction. Chargeback request 902 relates to the original transaction with a merchant, for example, merchant 24 (shown in FIG. 4), that is charged to an account assigned to cardholder 22, wherein cardholder 22 requests that a chargeback be applied. The original transaction would have been initiated using the payment card issued to cardholder 22 by issuer 30 and would have been processed by a payment card network 908, which is similar to payment server system 112. In the example embodiment, the original transaction would have involved charging at least one original transaction at a first exchange rate between two currencies.

Issuer 30 receives chargeback request 902 from cardholder 22 at issuer computer system 906. In the example embodiment, issuer 30 transmits chargeback request 902 as a chargeback transaction 910 to a chargeback settlement processing system, for example, CSP computer system 912, which is similar to CSP computer system 121 (shown in FIGS. 5 and 6). Chargeback transaction 910 represents chargeback request 902 submitted by cardholder 22. Chargeback transaction 910 is transmitted from issuer computer system 906 to CSP computer system 912. In the example embodiment, chargeback transaction 910 includes transaction data relating to the original transaction.

In the example embodiment, CSP computer system 912 is associated with a third party issuer processor authorized to settle chargeback transactions on behalf of issuer 30. In the example embodiment, CSP computer system 912 includes a processor 914 and a memory device 916. In an alternate embodiment, CSP computer system 912 may be associated with payment card network 908 and authorized to settle transactions on its behalf.

Figure 10:
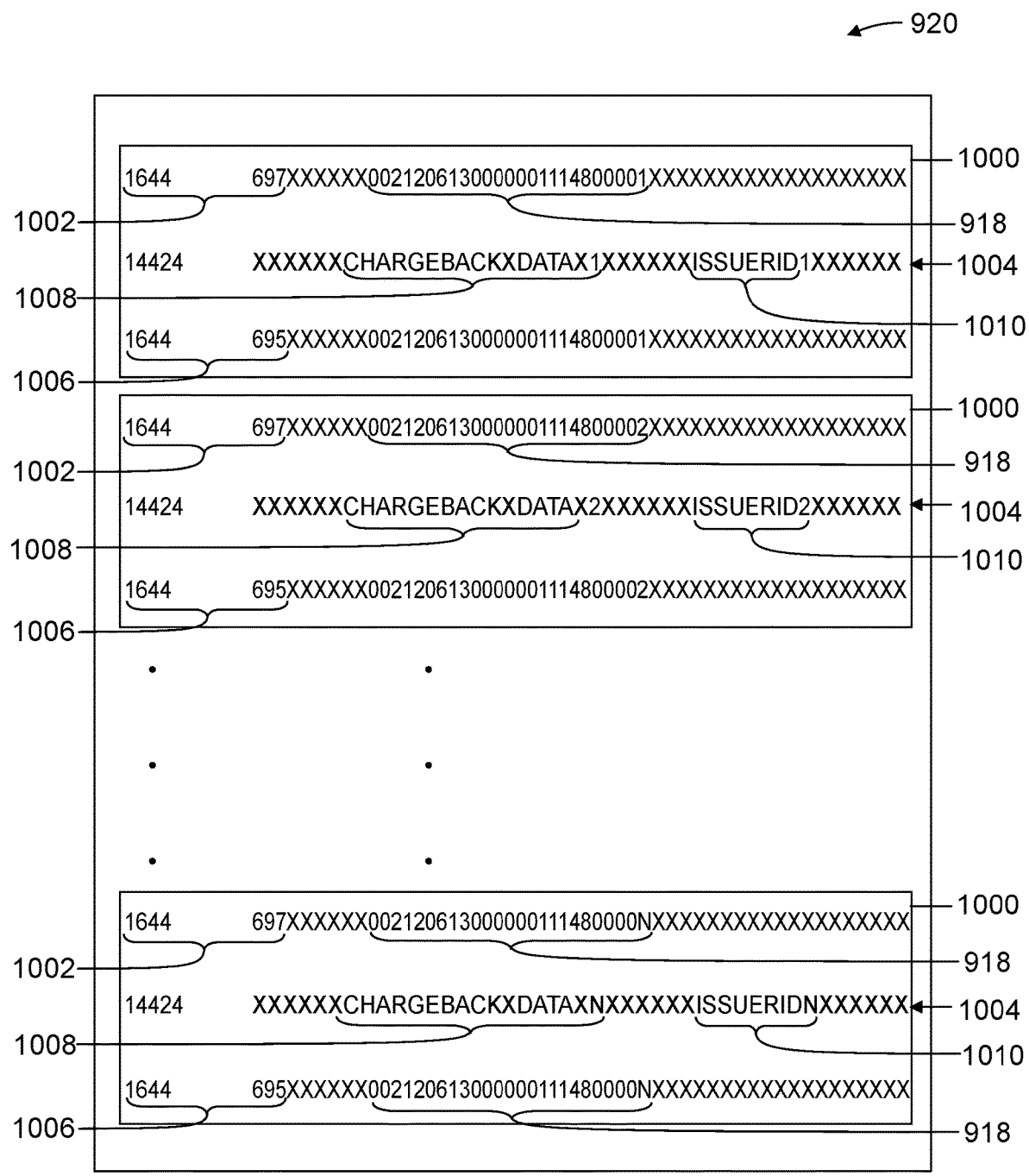
FIG. 10 is a screenshot of an example batch file generated by the CSP computer system as shown in FIG. 9.

FIG. 10 is a screenshot of an example batch file 920 that may be used with CSP computer system 912 in accordance with the present invention. To transmit chargeback transactions in compliance with the rules mandated by payment card network 908, CSP computer system 912 generates a batch file 920 containing multiple chargeback transactions 910 received that day from multiple issuers 30. Referring to FIGS. 9 and 10, when CSP computer system 912 receives a chargeback transaction 910 from issuer 30, CSP computer system 912 generates a chargeback transaction file 1000 for chargeback transaction 910. In the example embodiment, chargeback transaction file 1000 includes a file header 1002, detailed record 1004, and a file trailer 1006. File header 1002 identifies the beginning of chargeback transaction file 1000. In the example embodiment, file header 1002 is represented by the number "1644 697". File header 1002 also includes a unique file identifier 918 (e.g., "002120613000000111480001") assigned by processor 914 for identifying chargeback transaction 910. While unique file identifier 11 was used in the example of FIG. 2, to identify a file containing a net settlement amount for a plurality of transactions, in the example embodiment of FIGS. 9 and 10, unique file identifier 918 is used to identify a file directed to a single transaction. In the example embodiment, unique file identifier 918 includes a sequence number that starts at the number "00001" and increases for each subsequent chargeback transaction file 1000, up to number N chargeback transactions 910. File trailer 1006 identifies the end of the file for chargeback transaction 910. In the example embodiment, file trailer 1006 is represented by the number "1644 695". File trailer 1006 also includes unique file identifier 918, which represents the end of the data for chargeback transaction 910. Detailed record 1004 is included between file header 1002 and file trailer 1006. In the example embodiment, detailed record 1004 is represented by the code "14424". Detailed record 1004 includes transaction data 1008, such as data relating to the original transaction and the payment card (e.g., "CHARGEBACK-XDATAX1"), and an issuer identification (ID) number 1010 (e.g., "ISSUERID1") representing the issuer that owns the cardholder relationship. CSP computer system 912 associates each chargeback transaction file 1000 with a particular chargeback transaction 910 by including unique file identifier 918 for chargeback transaction 910 in file header 1002. CSP computer system 912 repeats this process for each chargeback transaction 910 received from multiple issuers 30 and stores the generated chargeback transaction files 1000 in batch file 920. Because each chargeback transaction 910 is associated with a separate chargeback transaction file 1000, payment card network 908 will settle each chargeback transaction 910 in batch file 920 with CSP computer system 912 at the individual transaction level, rather than at a net transaction level for each issuer 30.

After generating batch file 920, CSP computer system 912 stores batch file 920, which includes the number N chargeback transaction files 1000 with individual unique file identifiers 918, in memory device 916 so that CSP computer system 912 can match each chargeback transaction 910 with a settlement amount returned from payment card network 908.

In the example embodiment, at the end of each day, CSP computer system 912 transmits chargeback transaction files 1000 included within batch file 920 to payment card network 908 for chargeback settlement. Payment card network 908 facilitates the clearing, settlement, and chargeback processing of transactions between acquiring banks 26 and issuers 30 (or issuer processors on behalf of issuers 30). As part of its services, payment card network 908 determines an exchange rate to apply when the transaction is charged in a first currency associated with merchant 24 and is settled in one or more different currencies associated with cardholder 22. In the example embodiment, payment card network 908 processes batch file 920 and transmits chargeback transaction files 1000 to acquiring banks 26 through acquiring bank computer systems 921 for settlement.

Each acquiring bank 26 transmits a chargeback request 922 for chargeback transaction 910 using acquiring bank computer system 921 to at least one merchant 24 involved in the original transaction. Merchant 24 receives chargeback request 922 at a merchant computer system 923. While, in an example embodiment, merchant 24 does not respond to chargeback request 922, in another example embodiment, merchant 24 may transmits a chargeback response message 924 acknowledging receipt of chargeback request 922, which is subsequently forwarded by acquiring bank 26 to payment card network 908. Acquiring bank 26 settles with merchant 24 by debiting an account of merchant 24 for the amount of the original transaction. Acquiring bank 26 then settles with payment card network 908 for the amount credited to merchant 24 in the original transaction.

After settling with acquiring banks 26, payment card network 908 determines a second exchange rate for each chargeback transaction 910. The second exchange rate is the applicable exchange rate for the day of processing chargeback transaction 910. Due to daily fluctuation in exchange rates, the second exchange rate may differ from the first exchange rate applied at the time of the original transaction. The different exchange rates may cause the chargeback settlement amount received from payment card network 908 to differ from the amount received for the original transaction. Thus, issuer 30 may realize a gain or a loss on each chargeback transaction 910 depending on the change in exchange rate between the time of the original transaction and the time of the chargeback transaction.

Figure 11:
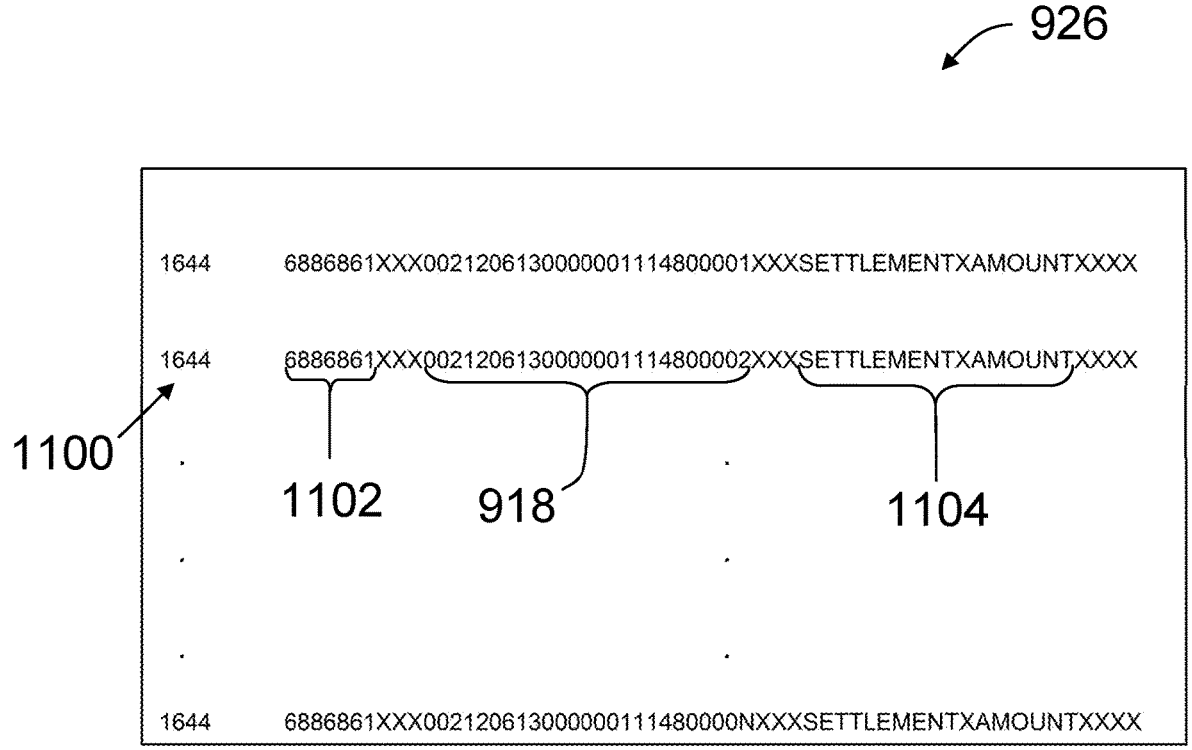
FIG. 11 is a screenshot of an example reconciliation message that may be used with the CSP computer system as shown in FIG. 9.

FIG. 11 is a screenshot of an example reconciliation file 926 that may be used with CSP computer system 912 (shown in FIG. 9) in accordance with the present invention. Referring to FIGS. 9 and 11, in the example embodiment, payment card network 908 transmits reconciliation file 926 to CSP computer system 912. Reconciliation file 926 includes a message type code segment 1100, a settlement position detail record 1102, unique file identifier 918, and a settlement amount 1104. In the example embodiment, segment 1100 is represented by the number "1644", which indicates to CSP computer system 912 that the file contains a reconciliation message. Position detail record 1102 includes updated transaction information used by CSP computer system 912 to update its data files. Unique file identifier 918 is the same identifier used by CSP computer system 912 for each chargeback transaction file 1000 when sending out batch file 920 and is associated with a specific chargeback transaction 910. Settlement amount 1104 is the amount of money received from payment card network 908 after application of the second exchange rate.

CSP computer system 912 matches each chargeback transaction 910 stored in memory device 916 to its corresponding chargeback settlement amount based on unique file identifiers 918. Once each chargeback transaction 910 is matched to its settlement amount 1104, CSP computer system 912 determines a net gain or loss for each settled chargeback transaction 910 due to the change in exchange rate from the time of the original transaction to the time of the chargeback transaction. To determine the net gain or loss, CSP computer system 912 compares the amount of money received in settlement for the original transaction calculated at the first exchange rate with settlement amount 1104 of the chargeback transaction calculated at the second exchange rate. CSP computer system 912 then provides each issuer 30 with a detailed settlement report 928 that includes settlement amount 1104 and/or the net gain or loss to issuer 30 for each chargeback transaction 910 based on the second exchange rate.

Figure 12:
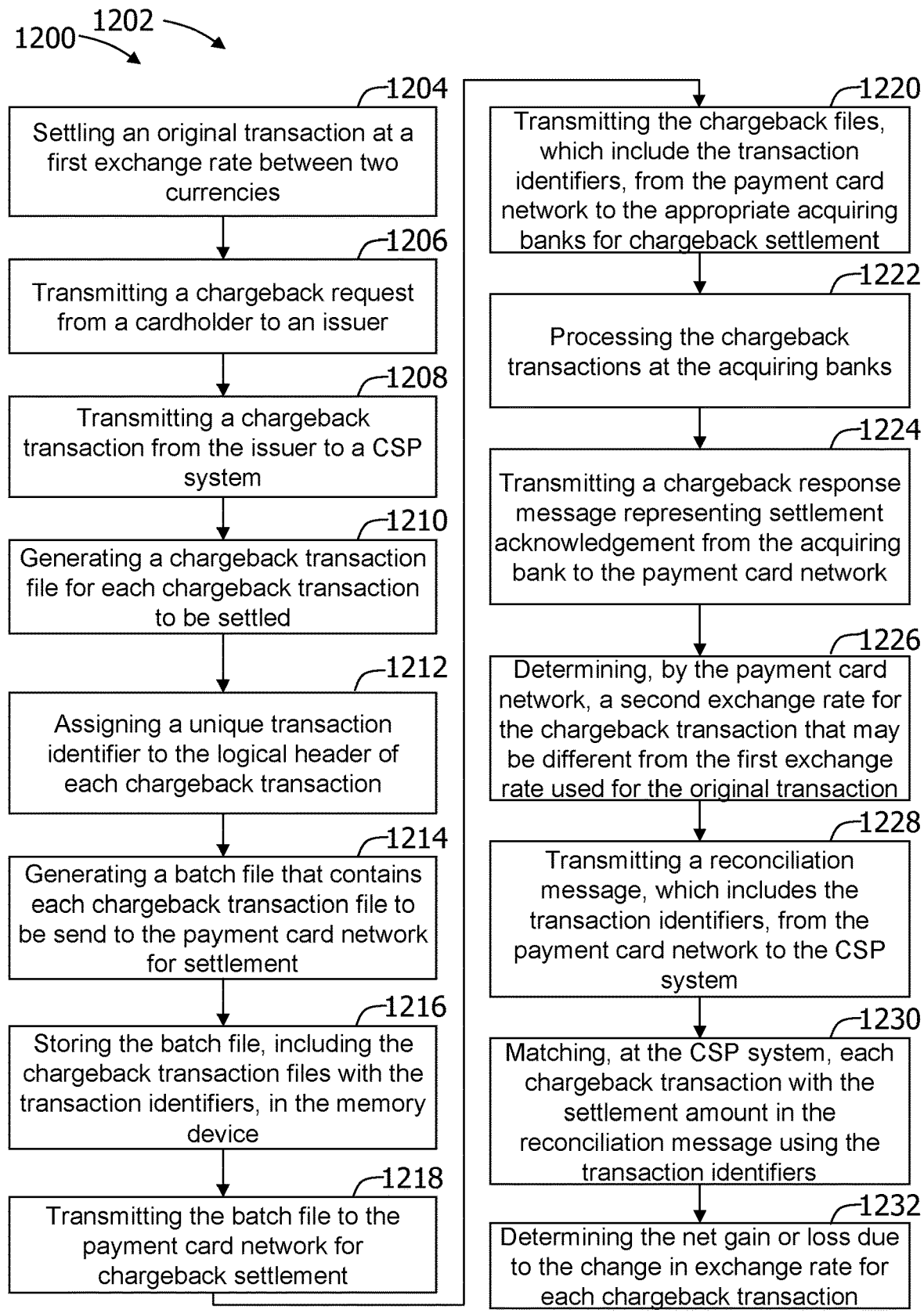
FIG. 12 is a flow diagram showing a method of settling chargeback transactions involving varying exchange rates between multiple currencies, which may be implemented using the CSP computer systems shown in FIGS. 5, 6, and 9.

FIG. 12 illustrates flow chart 1200 of an example method 1202 of determining a gain or loss in a chargeback transaction that includes a currency conversion using the CSP computer system shown in FIG. 9. In the example embodiment, a payment card system 900 (shown in FIG. 9) settles 1204 an original transaction between a cardholder 22 (shown in FIG. 4) and a merchant 24 (shown in FIG. 4) at a first exchange rate involving two currencies or more currencies. Cardholder 22 utilized a payment card issued to cardholder 22 by an issuer 30 (shown in FIG. 4) to initiate the original transaction.

Cardholder 22 transmits 1206 a chargeback request 902 (shown in FIG. 9) to issuer 30 requesting chargeback of at least a portion of the original transaction. In the example embodiment, cardholder 22 transmits chargeback request 902 using cardholder computer system 904 (shown in FIG. 9) and issuer 30 receives chargeback request 902 at issuer computer system 906 (shown in FIG. 9).

Issuer 30 transmits 1208 a chargeback transaction 910 (shown in FIG. 9) to a CSP computer system 912 (shown in FIG. 9). Chargeback transaction 910 represents chargeback request 902 submitted by cardholder 22. In the example embodiment, chargeback transaction 910 includes transaction data relating to the original transaction. CSP computer system 912 receives chargeback transaction 910, including the transaction data.

CSP computer system 912 generates 1210 a chargeback transaction file 1000 (shown in FIG. 10) for chargeback transaction 910. A processor 914 (shown in FIG. 9) of CSP computer system 912 generates a file header 1002 (shown in FIG. 10), detailed record 1004 (shown in FIG. 10) and a file trailer 1006 (shown in FIG. 10). File header 1002 identifies the beginning of the data for chargeback transaction 910. Processor 914 assigns 1212 a unique file identifier 918 (shown in FIG. 9) to chargeback transaction file 1000. Unique file identifier 918 is located in file header 1002. File trailer 1006 identifies the end of the data file for chargeback transaction 910. File trailer 1006 also includes unique file identifier 918. Detailed record 1004 is included between file header 1002 and file trailer 1006. Detailed record 1004 includes transaction data 1008 (shown in FIG. 10) relating to the original transaction for which chargeback has been requested, and an issuer identification (ID) number 1010 (shown in FIG. 10) representing the issuer that owns the cardholder relationship. CSP computer system 912 associates each chargeback transaction file 1000 with a particular chargeback transaction 910 by including unique file identifier 918 for chargeback transaction 910 in file header 1002.

CSP computer system 912 repeats this process for each chargeback transaction 910 received from multiple issuers 30

To transmit chargeback transactions in compliance with the rules mandated by payment card network 908, CSP computer system 912 generates 1214 a batch file 920 (shown in FIG. 9) that contains multiple chargeback transaction files 1000 received that day from multiple issuers 30 to be sent to a payment card network 908 (shown in FIG. 9) for settlement.

CSP computer system 912 stores 1216 batch file 920 in memory device 916. Batch file 920 includes chargeback transaction files 1000 with unique file identifiers 918. Storing batch file 920 enables CSP computer system 912 to match each chargeback transaction 910 with a corresponding settlement amount returned from payment card network 908.

At the end of each day, CSP computer system 912 transmits 1218 chargeback transaction files 1000 included within batch file 920 to payment card network 908 for chargeback settlement. In the example embodiment, payment card network 908 facilitates the clearing, settlement, and chargeback processing of transactions between acquiring banks 26 and issuers 30 (or issuer processors on behalf of issuers 30). As part of its services, payment card network 908 determines an exchange rate to apply when the transaction is charged in a first currency associated with merchant 24 and is settled in one or more different currencies associated with cardholder 22. In the example embodiment, payment card network 908 processes batch file 920 and transmits 1220 each chargeback transaction file 1000 to acquiring banks 26 through acquiring bank computer systems 921 for settlement.

Each acquiring bank 26 processes 1222 chargeback transactions 910. As described herein, each acquiring bank 26 may, in an example embodiment, transmit 1224 a chargeback response message 924 (shown in FIG. 9) to payment card network 908 representing acknowledgement of settlement. In an example embodiment, response message 924 includes unique file identifier 918 associated with chargeback transaction file 1000. Acquiring bank 26 settles with payment card network 908 for the amount credited to merchant 24 in the original transaction.

Payment card network 908 determines 1226 a second exchange rate for each chargeback transaction 910. The second exchange rate is the applicable exchange rate for the day of processing each chargeback transaction 910. Because of daily fluctuation in exchange rates, the second exchange rate may differ from the first exchange rate used at the time of the original transaction.

Payment card network transmits 1228 a reconciliation file 926 (shown in FIG. 9) to CSP computer system 912. In the example embodiment, reconciliation file 926 includes a message type code segment 1100 (shown in FIG. 11), a settlement position detail record 1102 (shown in FIG. 11), unique file identifier 918, and a settlement amount 1104 (shown in FIG. 11). Position detail record 1102 includes updated transaction information used by CSP computer system 912 to update its data files. Unique file identifier 918 is the same identifier used by CSP computer system 912 when sending out batch file 920 and is associated with a specific chargeback transaction 910. Settlement amount 1104 is the amount of money received from payment card network 908 after application of the second exchange rate.

CSP computer system 912 matches 1230 each chargeback transaction 910 stored in memory device 916 to its corresponding settlement amount based on unique file identifiers 918. Once each chargeback transaction 910 is matched to its settlement amount, CSP computer system 912 determines 1232 the net gain or loss for each chargeback transaction 910 due to the change in exchange rate from the time of the original transaction to the time of the chargeback transaction. To determine the net gain or loss, CSP computer system 912 compares the amount of money received in settlement for the original transaction calculated at the first exchange rate with the settlement amount of the chargeback transaction calculated at the second exchange rate. CSP computer system 912 then provides issuer 30 with a detailed settlement report 928 (shown in FIG. 9) that includes the settlement amount and/or the net gain or loss to issuer 30 based on the second exchange rate used for each chargeback transaction 910.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are for example only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is receiving at least one chargeback transaction requesting a chargeback for at least one original transaction settled using a first exchange rate between two or more currencies, wherein the at least one chargeback transaction is transmitted by an issuer computer device, generating a chargeback transaction file for each of the at least one chargeback transaction, wherein for each of the at least one chargeback transaction, the chargeback transaction file includes a file header including a unique file identifier, transaction data for the at least one original transaction associated with the at least one chargeback transaction, and a file trailer, generating, at the CSP computer system, a batch file including a plurality of chargeback transaction files to be settled, storing the batch file in the memory device, wherein the batch file includes the plurality of chargeback transaction files, each transaction file including the unique file identifier, transmitting the batch file from the CSP computer system to a payment card network for settlement of the at least one chargeback transaction, receiving a reconciliation message from the payment card network, wherein the reconciliation message includes an associated settlement amount for each chargeback transaction and the unique file identifiers associated with each chargeback transaction, wherein the settlement amount is determined at a second exchange rate, matching, at the CSP computer system, each chargeback transaction to the associated chargeback settlement amount using the unique file identifiers, and determining one of a net gain and a net loss for each chargeback transaction due to a difference in the first exchange rate at the time of each original transaction and the second exchange rate at the time of each chargeback transaction. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of systems and methods for settling payment card chargeback transactions involving varying currency exchange rates using a payment card network provides a cost-effective, secure, and reliable means for calculating a gain or loss to payment card issuers resulting from chargeback transactions involving varying currency exchange rates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A chargeback settlement processing (CSP) computer system comprising at least one processor communicatively coupled to a memory device, the at least one processor configured to:
store, in the memory device, a single chargeback transaction batch file, a reconciliation file, and a settlement report for a plurality of chargeback transactions including a first chargeback transaction settled at a first currency exchange rate and a second chargeback transaction settled at a second currency exchange rate, wherein:
the chargeback transaction batch file comprises a first chargeback transaction sub-file and a second chargeback transaction sub-file, wherein:
the first chargeback transaction sub-file comprises a file header, a first detailed record including a first set of chargeback transaction data including a first chargeback transaction amount of a first chargeback transaction settled at a first currency exchange rate, an issuer identifier corresponding to an issuer computer device, a first unique file identifier for identifying the first chargeback transaction, and a file trailer, wherein the first unique file identifier is appended to each of the file header and the file trailer for uniquely identifying the first chargeback transaction at an individual transaction level; and
the second chargeback transaction sub-file comprises the file header, a second detailed record including a second set of chargeback transaction data including a second chargeback transaction amount of a second chargeback transaction settled at a second currency exchange rate, the issuer identifier, a second unique file identifier for identifying the second chargeback transaction, and the file trailer, wherein the second unique file identifier is appended to each of the file header and the file trailer for uniquely identifying the second chargeback transaction at an individual transaction level;
the reconciliation file includes the first unique file identifier, a first settlement amount determined at a third currency exchange rate for the first chargeback transaction, the second unique file identifier, and a second settlement amount determined at a fourth currency exchange rate for the second chargeback transaction; and
the settlement report includes the first unique file identifier for identifying the first chargeback transaction and the second unique file identifier for identifying the second chargeback transaction;
associate (i) the first chargeback transaction sub-file with the first chargeback transaction by appending the first unique file identifier to the file header within the first chargeback transaction sub-file, and (ii) the second chargeback transaction sub-file with the second chargeback transaction by appending the second unique file identifier to the file header within the second chargeback transaction sub-file; and
match (i) the first chargeback transaction amount to the first settlement amount based on the first unique file identifier, and (ii) the second chargeback transaction amount to the second settlement amount based on the second unique file identifier,
wherein the settlement report enables the issuer computer device to determine at least one of a net gain and a net loss for the first chargeback transaction at the individual transaction level.

2. The CSP computer system in accordance with claim 1, wherein the chargeback transaction batch file includes an identifier of a start of the first chargeback transaction sub-file in the file header and an identifier of an end of the first chargeback transaction sub-file via the file trailer.

3. The CSP computer system in accordance with claim 1, wherein the first chargeback transaction is associated with a payment card, said system further comprising means for associating the single chargeback transaction batch file with an issuer of the payment card, based on the issuer identifier.

4. The CSP computer system in accordance with claim 1, wherein the at least one processor is configured to receive, over an electronic network from the issuer computer device, the plurality of chargeback transactions.

5. The CSP computer system in accordance with claim 1, wherein the at least one processor is configured to match the first chargeback transaction amount to the first associated settlement amount based on the first unique file identifier means for by identifying a settlement position detail record that includes the first unique file identifier that corresponds to both the first chargeback transaction amount and the first associated settlement amount.

6. The CSP computer system in accordance with claim 1, wherein the settlement report enables the issuer computer device to calculate a numerical difference between the first chargeback transaction amount and a corresponding settlement amount based on the third currency exchange rate.

7. The CSP computer system in accordance with claim 1, wherein the at least one processor is configured to determine that a received file contains reconciliation information by identifying that a message type code segment denoting reconciliation information is included in the received file.

8. A method of data storage and retrieval using a chargeback settlement processing (CSP) computer system including at least one processor communicatively coupled to a memory device, said method comprising:

storing in the memory device, a chargeback transaction batch file, a reconciliation file, and a settlement report for a plurality of chargeback transactions including a first chargeback transaction settled at a first currency exchange rate and a second chargeback transaction settled at a second currency exchange rate, wherein:

the chargeback transaction batch file comprises a first chargeback transaction sub-file and a second chargeback transaction sub-file, wherein:

the first chargeback transaction sub-file comprises a file header, a first detailed record including a first set of chargeback transaction data including a first chargeback transaction amount of a first chargeback transaction settled at a first currency exchange rate, an issuer identifier corresponding to an issuer computer device, a first unique file identifier for identifying the first chargeback transaction, and a file trailer, wherein the first unique file identifier is appended to each of the file header and the file trailer for uniquely identifying the first chargeback transaction at an individual transaction level; and the second chargeback transaction sub-file comprises the file header, a second detailed record including a second set of chargeback transaction data including a second chargeback transaction amount of a second chargeback transaction settled at a second currency exchange rate, the issuer identifier, a second unique file identifier for identifying the second chargeback transaction, and the file trailer, wherein the second unique file identifier is appended to each of the file header and the file trailer for uniquely identifying the second chargeback transaction at an individual transaction level;

the reconciliation file includes the first unique file identifier, a first settlement amount determined at a third currency exchange rate for the first chargeback transaction, the second unique file identifier, and a second settlement amount determined at a fourth currency exchange rate for the second chargeback transaction; and the settlement report includes the first unique file identifier for identifying the first chargeback transaction and the second unique file identifier for identifying the second chargeback transaction;

associating (i) the first chargeback transaction sub-file with the first chargeback transaction by appending the first unique file identifier to the file header within the first chargeback transaction sub-file, and (ii) the second chargeback transaction sub-file with the second chargeback transaction by appending the second unique file identifier to the file header within the second chargeback transaction sub-file; and matching the first chargeback transaction amount to the first settlement amount based on the first unique file identifier, and the second chargeback transaction amount to the second settlement amount based on the second unique file identifier, wherein the settlement report enables the issuer computer device to determine at least one of a net gain and a net loss for the first chargeback transaction at the individual transaction level.

9. The method in accordance with claim 8, wherein the chargeback transaction batch file includes an identifier of a start of the first chargeback transaction sub-file in the file header and an identifier of an end of the first chargeback transaction sub-file via the file trailer.

10. The method in accordance with claim 8, wherein the first chargeback transaction is associated with a payment card, said method further comprising associating the chargeback transaction batch file with an issuer of the payment card, based on the issuer identifier.

11. The method in accordance with claim 8, further comprising receiving, over an electronic network from the issuer computer device, the plurality of chargeback transactions.

12. The method in accordance with claim 8, wherein matching the first chargeback transaction amount to the first associated settlement amount based on the first unique file identifier further comprises identifying a settlement position detail record that includes the first unique file identifier that corresponds to both the first chargeback transaction amount and the first associated settlement amount.

13. The method in accordance with claim 8, wherein the settlement report enables the issuer computer device to calculate a numerical difference between the first chargeback transaction amount and a corresponding settlement amount based on the third currency exchange rate.

14. The method in accordance with claim 8, further comprising determining that a received file contains reconciliation information by identifying that a message type code segment denoting reconciliation information is included in the received file.

15. One or more computer-readable storage media having computer-executable instructions embodied thereon for data storage and retrieval using a chargeback settlement processing (CSP) computer system comprising at least one processor in communication with a memory device, wherein when executed by the at least one processor, the computer-executable instructions cause the at least one processor to:

store, in the memory device, a chargeback transaction batch file, a reconciliation file, and a settlement report for a plurality of chargeback transactions including a first chargeback transaction settled at a first currency exchange rate and a second chargeback transaction settled at a second currency exchange rate, wherein:

the chargeback transaction batch file comprises a first chargeback transaction sub-file and a second chargeback transaction sub-file, wherein:

the first chargeback transaction sub-file comprises a file header, a first detailed record including a first set of chargeback transaction data including a first chargeback transaction amount of a first chargeback transaction settled at a first currency exchange rate, an issuer identifier corresponding to an issuer computer device, a first unique file identifier for identifying the first chargeback transaction, and a file trailer, wherein the first unique file identifier is appended to each of the file header and the file trailer for uniquely identifying the first chargeback transaction at an individual transaction level; and the second chargeback transaction sub-file comprises the file header, a second detailed record including a second set of chargeback transaction data including a second chargeback transaction amount of a second chargeback transaction settled at a second currency exchange rate, the issuer identifier, a second unique file identifier for identifying the second chargeback transaction, and the file trailer, wherein the second unique file identifier is appended to each of the file header and the file trailer for uniquely identifying the second chargeback transaction at an individual transaction level;

the reconciliation file includes the first unique file identifier, a first settlement amount determined at a third currency exchange rate for the first chargeback transaction, the second unique file identifier, and a second settlement amount determined at a fourth currency exchange rate for the second chargeback transaction; and the settlement report includes the first unique file identifier for identifying the first chargeback transaction and the second unique file identifier for identifying the second chargeback transaction;

associate (i) the first chargeback transaction sub-file with the first chargeback transaction by appending the first unique file identifier to the file header within the first chargeback transaction sub-file, and (ii) the second chargeback transaction sub-file with the second chargeback transaction by appending the second unique file identifier to the file header within the second chargeback transaction sub-file; and match (i) the first chargeback transaction amount to the first settlement amount based on the first unique file identifier, and (ii) the second chargeback transaction amount to the second settlement amount based on the second unique file identifier, wherein the settlement report enables the issuer computer device to determine at least one of a net gain and a net loss for the first chargeback transaction at the individual transaction level.

16. The computer-readable storage media in accordance with claim 15, wherein the chargeback transaction batch file includes an identifier of a start of the first chargeback transaction sub-file in the file header and an identifier of an end of the first chargeback transaction sub-file via the file trailer.

17. The computer-readable storage media in accordance with claim 15, wherein the first chargeback transaction is associated with a payment card, and wherein the computer-executable instructions further cause the at least one processor to associate the chargeback transaction batch file with an issuer of the payment card, based on the issuer identifier.

18. The computer-readable storage media in accordance with claim 15, wherein the computer-executable instructions further cause the at least one processor to receive, over an electronic network from the issuer computer device, the plurality of chargeback transactions.

19. The computer-readable storage media in accordance with claim 15, wherein the computer-executable instructions further cause the at least one processor to match the first chargeback transaction amount to the first associated settlement amount based on the first unique file identifier by identifying a settlement position detail record that includes the first unique file identifier that corresponds to both the first chargeback transaction amount and the first associated settlement amount.

20. The computer-readable storage media in accordance with claim 15, wherein the settlement report enables the issuer computer device to determine the at least one of the net gain and the net loss for the first chargeback transaction at the individual transaction level by calculating a numerical difference between the first chargeback transaction amount and a corresponding settlement amount based on the third currency exchange rate.

21. The computer-readable storage media in accordance with claim 15, wherein the computer-executable instructions further cause the at least one processor to determine that a received file contains reconciliation information by identifying that a message type code segment denoting reconciliation information is included in the received file.

* * * * *